(12) United States Patent
Frommann et al.

(10) Patent No.: US 9,656,544 B2
(45) Date of Patent: May 23, 2017

(54) MOTOR VEHICLE FLAP ARRANGEMENT

(71) Applicant: GM GLOBAL TECHNOLOGY OPERATIONS LLC, Detroit, MI (US)

(72) Inventors: Markus Frommann, Bingen am Rhein (DE); Heiko Betzen, Bausendorf (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/642,011

(22) Filed: Mar. 9, 2015

(65) Prior Publication Data
US 2015/0224872 A1 Aug. 13, 2015

Related U.S. Application Data

(63) Continuation-in-part of application No. 14/028,763, filed on Sep. 17, 2013, now Pat. No. 9,139,085.

(30) Foreign Application Priority Data

Mar. 10, 2014 (DE) .................. 10 2014 003 056

(51) Int. Cl.
*B60K 15/05* (2006.01)
*B60K 15/04* (2006.01)

(52) U.S. Cl.
CPC .............. *B60K 15/05* (2013.01); *B60K 15/04* (2013.01); *B60K 15/0406* (2013.01); *B60K 2015/0425* (2013.01); *B60K 2015/053* (2013.01); *B60K 2015/0576* (2013.01)

(58) Field of Classification Search
CPC ...... B60K 2015/053; B60K 2015/0576; B60K 2015/0425; B60K 15/04; B60K 15/0406; B60K 15/05

USPC ...................... 296/97.2, 97.22, 155; 292/198
See application file for complete search history.

(56) References Cited

U.S. PATENT DOCUMENTS

| | | | |
|---|---|---|---|
| 6,234,556 B1 * | 5/2001 | Janssen | B60K 15/05 296/97.22 |
| 6,499,789 B2 | 12/2002 | Moll et al. | |
| 7,185,938 B2 * | 3/2007 | Beck | B60K 15/04 292/207 |
| 7,258,245 B2 | 8/2007 | Bauer | |
| 8,677,690 B2 | 3/2014 | Lee et al. | |

(Continued)

FOREIGN PATENT DOCUMENTS

| | | |
|---|---|---|
| DE | 10109649 A1 | 9/2002 |
| DE | 10148199 A1 | 4/2003 |
| DE | 10148499 A1 | 4/2003 |

(Continued)

OTHER PUBLICATIONS

German Patent Office, German Search Report for Country Application No. 10 2014 003 056.3, dated Dec. 12, 2014.

(Continued)

*Primary Examiner* — Joseph D Pape
*Assistant Examiner* — Dana Ivey
(74) *Attorney, Agent, or Firm* — Lorenz & Kopf, LLP (57) ABSTRACT

A flap arrangement is provided for a motor vehicle with a moveably mounted flap that is in particular a preloaded tank flap, a holder for fixing the flap, an actuator for actuating the holder, and a switch for selectively operating the actuator. The actuator is equipped in order to actuate the holder for fixing and for releasing the flap.

16 Claims, 10 Drawing Sheets

(56) References Cited

U.S. PATENT DOCUMENTS

| | | |
|---|---|---|
| 8,870,241 B2 | 10/2014 | Lee et al. |
| 2014/0084620 A1 | 3/2014 | Frommann et al. |

FOREIGN PATENT DOCUMENTS

| | | |
|---|---|---|
| DE | 10330503 A1 | 2/2005 |
| DE | 102008057860 A1 | 7/2010 |
| DE | 2011050412 U1 | 8/2011 |
| DE | 202010008751 U1 | 1/2012 |
| DE | 102011012699 A1 | 9/2012 |
| GB | 2348922 A | 10/2000 |
| JP | 2009292432 A | 12/2009 |
| WO | 2005077699 A1 | 8/2005 |

OTHER PUBLICATIONS

Great Britain Patent Office, Great Britain Search Report for Great Britain Application No. 1502082.9, dated Jul. 21, 2015.

* cited by examiner

MOTOR VEHICLE FLAP ARRANGEMENT

CROSS-REFERENCE TO RELATED APPLICATION

This application is a continuation-in-part of U.S. patent application Ser. No. 14/028,763 filed on Sep. 17, 2013 which claims priority to the benefit of German Patent Application No. 102012018489.1 filed Sep. 17, 2013. This application also claims priority to German Patent Application No. 102014003056.3, filed Mar. 10, 2014. The entire disclosure of each of the above applications is incorporated herein by reference.

TECHNICAL FIELD

This application pertains to a flap arrangement for a motor vehicle with a moveably mounted flap, in particular a tank flap, a motor vehicle, in particular a passenger car, with such a flap arrangement, and to a method and a computer program product for controlling an actuator of such a flap arrangement.

BACKGROUND

From WO 2005/077699 A1 a device for locking and unlocking a tank flap on motor vehicles with a locking part is known, which can be moved into an unlocking position through an electromagnet. The locking part includes a bevel, via which upon a closing movement of the flap it is shifted against a compression spring in the direction of the unlocking position. Following the overcoming of a geometry-related locking point, the locking part engages through the compression spring and holds the flap closed.

U.S. Pat. App. Pub. 2014/0084620, which claims priority to German Patent Application 102012018489.1 and has been expressly incorporated by reference herein, discloses an improved flap arrangement for a motor vehicle. In particular, the flap arrangement includes a flap, which is pivotally mounted on a body of the motor vehicle. The flap may be rotatably mounted about an axis on the vehicle structure, which preferably is substantially vertically oriented. The flap is preloaded in an opening or closing direction through a spring such as a torsion and/or tension spring. The flap when in a closed position terminates flush with a surface of the vehicle structure surrounding the flap.

SUMMARY

In accordance with the present disclosure, a flap arrangement includes a flap, which is moveably mounted, in particular pivotably mounted on a vehicle structure. The flap may be a tank flap and is further described herein but is not restricted to a particular application. It can equally be a cover or similar flap that is arranged on the exterior of the vehicle or in the vehicle interior, in particular a passenger or load compartment of the vehicle. A tank flap in terms of the present disclosure is intended to mean a flap which is provided or arranged for covering a single or multiple channel tank aperture of the vehicle for fuel filling in liquid and/or gaseous form, and/or for connecting an electrical charging plug for charging an electric energy storage unit of the vehicle.

The flap arrangement further includes a holder for positively and/or frictionally joined fixing of the flap, an actuator for actuating, in particular moving and/or fixing the holder, and a switch for actuating the actuator. The actuator is equipped in order to actuate the holder for securing and for releasing the flap.

Because of the fact that the holder is actuatable by the actuator also for fixing the flap, the fixing can be improved. In particular its reliability can be increased. Additionally or alternatively, the flap can be fixed in a preset position preferably adjustable by the actuator. Accordingly, the holder in a further development is equipped or designed in order to fix the flap in at least two different positions, in particular variably or continuously between two different positions.

In an embodiment, the flap is adjustable by the holder in a guided manner. This is to mean in particular that the flap in particular guided by the holder in a positively joined manner is adjustable from a first fixed position into at least a second fixed position. Preferably, the flap, because of this, can be fixed in a position that is flush with a flap surroundings, in particular vehicle body, in a position that relative to this is projected and/or recessed in contrast with this or can be brought into such a position.

In an embodiment, the holder includes a thread portion which can be brought into engagement with a counter-thread or mating thread of the flap in order to fix the same. The holder releases the flap when thread and mating thread are brought out of engagement. Here, the thread of the holder can in particular be an external or internal thread, and the mating thread in particular an internal or external thread, respectively. In a further development, the thread can be integrally formed with the holder and/or the mating thread integrally formed with the flap. The flap can be fixed in various positions and adjusted guided in a positively joined manner in particular by a thread and a mating thread that is in engagement with the thread.

In an embodiment, the holder can be shiftably mounted. In particular, the holder can be designed as a shiftably mounted spindle which in a further development can include the previously explained thread at a first end. In a further development, the holder is shiftably mounted in movement direction of the flap. Here, a movement direction of the flap is to mean in particular a direction in which the flap can be transferred between an opened or released position and a closed or fixed position. When the flap is pivotably mounted about an axis of rotation a movement direction in terms of the present disclosure can in particular be a tangential direction to this pivot movement. In an embodiment, the holder is at least substantially shiftably mounted in a linear or translating manner. In particular for compensating for a deviation between the tangential direction explained above that varies with a pivot angle and a movement direction of a linear mounting the thread and mating thread explained above can include an angular play. Here this is to mean that an axis of the mating thread can deviate by an angle relative to an axis of the thread with which it is in engagement. Additionally or alternatively, a linear mounting or guide of the holder can include a twisting play of the holder so that its axis can align itself to the movement direction of the flap.

In a further development, the holder is shiftably mounted against a preload. To this end, the flap arrangement can include a spring means, in particular a tension or compression spring which can be designed or arranged so that with closed flap it can be preloaded, in particular stretched or compressed in longitudinal direction. In this way, the holder with opened flap can be preloaded in a well-defined position in order to lift or open an electrical contact of the switch.

In an embodiment, the switch is actuated by a manual movement of the flap. The switch can include an electrical switch, in particular an unactuated opened switch or button, and preferably a pressure switch. The switch can be preloaded into an opened position for example with a spring or the like.

In a further development, the switch can be actuated directly by the flap or indirectly, in particular via the holder. In a further development, the holder may, on an end facing away from the flap or located opposite the flap, include a rounded-off contact surface, through which the switch is actuatable. In a further development, the holder itself can include an electrically conductive region for closing an electrical contact of the switch or form a part of the switch.

In an embodiment, the actuator and the holder are coupled via a gearing. In particular when the holder includes a thread that can be brought into engagement with a mating thread of the flap in order to adjust or fix or release the same, the holder in an embodiment can be rotatably mounted. The actuator can be designed or arranged for rotationally actuating, i.e. for applying a torque to the holder. To this end, an output shaft of the actuator, in particular of an electric motor of the actuator, can be coupled to the holder via the gearing. In an embodiment, the gearing includes one or multiple gear stages, in particular at least one spur gear, cross-helical gear, worm gear and/or planet stages.

In order to facilitate shifting of the holder at least one gear of the gearing is coupled to the holder in a rotationally fixed but axially shiftable manner relative to the actuator. The gearing is also mounted in a rotatable and axially fixed manner with respect to a structure on which the actuator is fixed.

By a gear that is mounted axially fixed relative to the actuator, which is fastened on the holder in a rotationally fixed and axially shiftable manner, a shifting of this gear together with the holder is advantageously avoided in an embodiment. Because of this, coupling the gear with the actuator can be improved in an embodiment and/or a weight of the holder, which does not move along the gear which is mounted axially fixed relative to the actuator, can be reduced.

In an embodiment, a toothing of the gear is curved and/or inclined against an axis of rotation of the gear, for example the toothing can be a helical toothing. Because of this, the coupling of the gear to the actuator can be improved in an embodiment, such that a load capacity of the toothing is increased and/or a noise emission of the toothing is reduced.

In an embodiment, an axis of rotation of an output shaft of the actuator intersects an axis of rotation of the gear, at an angle that is greater than 60°, and preferably at least substantially equal to 90°. The gearing can thus include a bevel gear stage. In an embodiment, an axis of rotation of an output shaft of the actuator crosses an axis of rotation of the gear or is inclined against the axis of rotation of the gear by an angle which in an embodiment is greater than 60°, and preferably is at least substantially equal to 90°, without intersecting the axis of rotation of the gear. The gearing can thus include a cross-helical gear stage, a cross-helical spur gear stage and/or a worm gear stage, in particular be a cross-helical or worm gear stage. Because of this, the actuator and gear in an embodiment can be advantageously be arranged more compactly relative to one another.

In an embodiment, the gear is fastened to the spindle in a rotationally fixed and axially shiftable manner by means of at least one Woodruff, fitted or sliding key. Because of this, the gear and spindle in an embodiment can be connected in a simple manner in terms of construction and/or assembly. In an embodiment, an orientation tolerance and/or a movement play can be advantageously offset by a Woodruff key.

In another embodiment, the gear is fastened to the spindle in a rotationally fixed and axially shiftable manner by means of a multiple groove or multiple teeth, in particular splined profile. Because of this, axial guidance in an embodiment between gear and spindle, load capacity of a connection between gear and spindle and/or axial moveable between gear and spindle can be improved. Equally, in another embodiment, the gear can be fastened to the spindle in a rotationally fixed and axially fixable manner by means of a serrated or polygon profile. Because of this, an axial guidance and/or load capacity of a connection between gear and spindle can be further improved in an embodiment. In an embodiment, a tooth width of the gear is smaller than a shifting travel of the spindle for fixing and for releasing the flap. Because of this, the flap arrangement, in particular the gearing, can be a more compact construction in an embodiment.

In order to fix and release the flap, the holder is actuated in opposite direction in an embodiment. To this end, the flap arrangement in a further development includes a reversible drive for the actuating in the opposite direction of the holder. The reversible drive can in particular include a shift gearing which couples actuator and holder, and transmits a rotary movement of the actuator depending on the shifting position to the holder in opposite direction. Equally, the reversible drive can be integrated in particular through programming into a controller of the actuator and be equipped in order to activate the actuator in opposite direction. In a further development, the reversible drive is equipped in order to reverse the direction of rotation of an electric motor of the actuator, in particular in order to energize the electric motor in opposite direction.

In an embodiment, the flap arrangement includes a controller which is equipped in order to control the actuator based on an actuation, actuation duration and/or actuation sequence of the switch and/or of a state, in particular a position of the flap and/or of the vehicle, in particular of a central locking system and/or a force. Accordingly, an aspect of the present disclosure is to control the actuator based on an actuation, actuation duration and/or actuation sequence of the actuation means and/or of a state, in particular a position of the flap and/or a force.

In an embodiment, the actuator can be controlled based on an actuation of the switch. In particular it can actuate the holder for as long as the switch is actuated, for example a pressure switch is closed. In addition or alternatively it can be provided that the actuator actuates the holder based on an actuation duration or the switch. In particular it can actuate the holder in a preset manner, for example by a preset travel or up to the reaching of a preset force when the switch is actuated or has been actuated for a preset period of time, for example a pressure switch is closed for a preset period of time. This period of time in an embodiment can be very brief, in particular impulse-like. Accordingly, the actuator in an embodiment can actuate the holder in a preset manner, for example by a preset travel or up to the reaching of a preset force when the switch is actuated or has been actuated in a pulse-like manner.

Additionally or alternatively it can be provided that the actuator actuates the holder based on an actuation sequence of the switch. It can, in particular, actuate the holder in a preset manner, for example in a preset movement direction when it has been actuated beforehand. In a further development, the actuator upon successive actuation of the switch can actuate the holder alternately in opposite direction, in particular energize an electric motor alternately in opposite directions and/or alternately reverse its direction of rotation.

Equally, a direction of rotation of the actuator can be preset by a one-off actuating of the switch for a preset period of time, multiple actuating within a preset period of time, for example twice briefly in succession, or an opposite direction of rotation by actuating for another preset period of time.

Additionally or alternatively, the actuator can be controlled based on a state, in particular a position of the flap. In particular, it can actuate the holder for fixing the flap, when the same is in an opened state, when the switch is actuated, and/or actuate the holder for releasing the flap when the same is in a closed state, when the switch is actuated. Additionally or alternatively it can be provided that the actuator actuates the holder based on a force. Force in terms of the present disclosure is intended to include a linear force as well as an angular force in the form of a torque. In particular, the actuator can actuate the holder in the preset manner when a preset force acts on the switch, the flap, the holder and/or the actuator, in particular when a force acting thereon exceeds or undershoots a preset value. Accordingly it can be provided that the actuator actuates the holder until the actuation, in particular brought about by a stop, is counteracted by an opposite force which exceeds a preset limit value.

Generally, the controller in an embodiment of the present disclosure can control the actuator based on a travel or be designed to do so, in particular command a preset actuating travel which in a further development can at least substantially correspond to a screw-in depth of a thread and mating thread of holder and flap. Travel-based control is to also mean in particular a rotational speed control. Additionally or alternatively, the controller can control the actuator based on a force or be designed to do so, in particular command a preset actuating force and/or on reaching a preset actuating force discontinue actuation. Controlling in terms of the present disclosure is also intended to include controlling based on a detected actual quantity, detected preferably by a sensor means, for example an actual position of the tank flap or actual force of the actuator.

Additionally or alternatively, the actuator can be controlled based on a state of the vehicle, in particular of a central locking system and/or power source such as the ignition. In particular, actuation can be stopped in opening direction or for releasing when a central locking system is closed and/or a power source such as the ignition, is interrupted, or actuation in opening direction or for releasing be permitted only when a central locking system is opened and/or a power source such as the ignition, is switched on. Additionally or alternatively, actuation in closing direction or for closing can also be permitted when a central locking system is closed and/or a power supply, in particular ignition, is interrupted. Accordingly, the driver can close the flap by means of the actuator even following the closing of the central locking system or interruption of a power supply.

Various components of the flap arrangement of the present disclosure can be designed in terms of hardware and/or software, in particular include in particular digital processing, in particular microprocessor unit (CPU) that is preferably data or signal-connected to a storage and/or bus system and/or one or multiple programs or program modules. The CPU can be designed in order to execute commands which are implemented as a program stored in a storage system, to detect input signals from a data bus and/or output signals to a data bus. A storage system can include one or multiple in particular different storage media, in particular optical, magnetic, solid state and/or non-volatile media. The program can be of such a nature that it is capable of embodying or carrying out the methods described here so that the CPU can carry out the steps of such methods and thereby control in particular the actuator.

Additionally or alternatively to a force control, in particular a stopping of the actuator on reaching an in particular stop-based resistance against further retraction or closing of the flap, a friction clutch between actuator and flap, in particular between actuator and holder can be arranged which opens when a preset force is exceeded.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
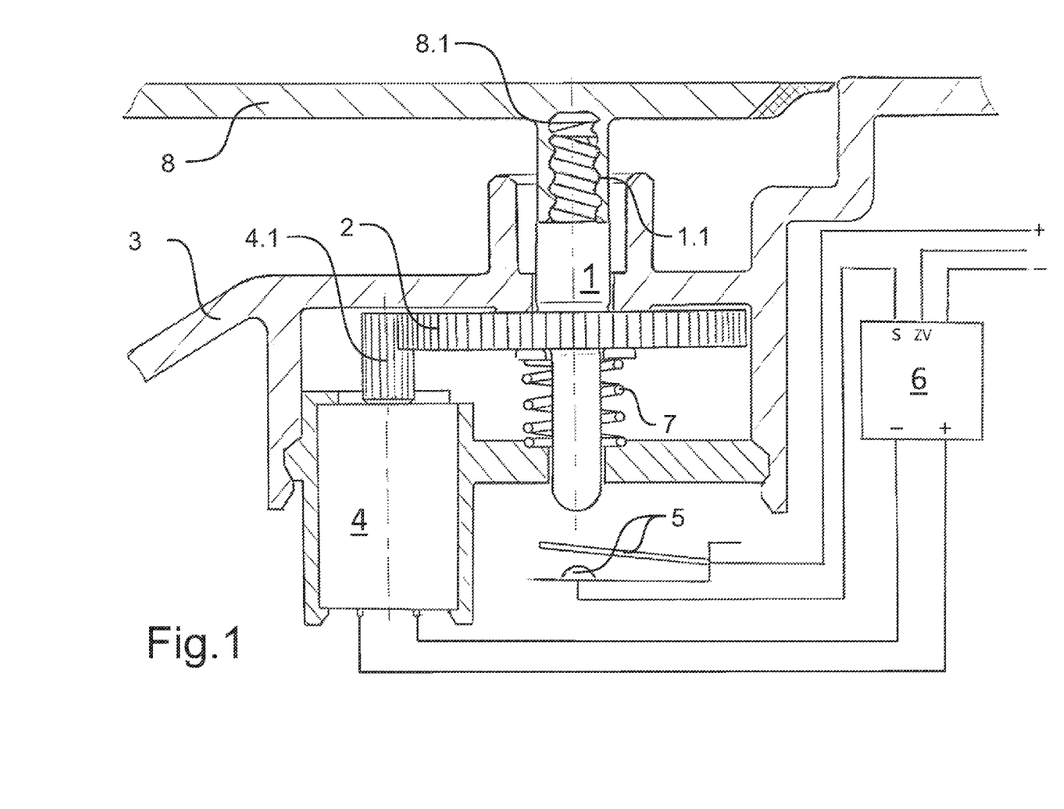
FIG. 1 shows a flap arrangement according to an embodiment in section with closed or fixed flap.

With initial reference to FIG. 1 to 7, a flap arrangement is disclosed and explained. This flap arrangement includes a tank flap 8, which in a manner that is not shown in FIG. 1 is moveably mounted on a body 3 of a passenger car. The body 3 includes a portion, in which a tank aperture (not shown) is arranged, which can be covered by the tank flap 8. The tank flap 8 is pivotable about a pivot axis that is perpendicular to the drawing plane of FIG. 1 by means of a hinge arrangement (not shown), wherein a torsion spring (not shown) preloads the tank flap 8 in an embodiment in FIG. 1 in clockwise direction into a closed position, in a modification in counter-clockwise direction into an opened position. In the position shown in FIG. 1, the tank flap 8 closes off flush with the surrounding edge of the body 3 alongside its circumference.

The flap arrangement includes a spindle-shaped holder 1 for fixing the tank flap 8, an actuator with an electric motor 4 for actuating the holder 1, a switch in the form of a pressure switch 5 for actuating the electric motor 4 and a controller in the form of a processor or CPU 6, which is operably connected to the electric motor 4 and the pressure switch 5. The CPU 6 can be signal-connected to a control unit of the vehicle (ECU) or at least partially integrated in or implemented by the latter.

The CPU 6 includes a reverser preferably of program design for actuating in opposite direction of the holder in that it is equipped in order to optionally supply the electric motor 4 in opposite direction, i.e. optionally in the mathematically positive or negative direction or optionally in clockwise or counter-clockwise direction as is described in more detail in the following.

The holder 1 includes a thread 1.1 on its face end (top in FIG. 1) facing the tank flap 8 which can be brought into engagement with a counter-thread or mating thread 8.1 of the tank flap 8 in order to fix the same. On its opposite face end the holder 1 has a rounded-off contact surface through which the pressure switch 5 is actuatable.

To this end, the holder 1 is shiftably mounted in movement directions of the tank flap 8 (vertically in FIG. 1) in two aligned recesses of body 3 and electric motor mounting 10 respectively and preloaded against a movement in closing direction of the tank flap 8 by a compression spring 7. As is described in the following, the pressure switch 5 is thus actuatable via the holder 1 by a manual movement of the tank flap 8 in closing direction (downwards in FIG. 1).

The electric motor 4 and the holder 1 are coupled via a gearing with a gear 4.1 and a further gear 2 meshing therewith, which is designed in a rotationally and axially fixed manner with the spindle-like holder 1 and is thus shiftable with the same. Through the electric motor 4, the holder 1 can be optionally actuated in clockwise or anti-clockwise direction. Because of the thread 1.1 and the mating thread 8.1, the holder 1, with thread 1.1 and mating thread 8.1 in engagement, adjusts the tank flap 8 in opening or closing direction guided in a positively joined manner. When thread 1.1 and mating thread 8.1 are in engagement or enter into engagement, the same fix the tank flap 8 in a positively joined respectively frictionally joined manner. If these are or are brought out of engagement, the tank flap 8 is or will be released because of this.

In the following, with reference to the figure sequence FIG. 1→FIG. 2→FIG. 3→FIG. 4→FIG. 5→FIG. 6→FIG. 1, a method for controlling the electric motor 4 and thus for opening or releasing (figure sequence FIG. 1→FIG. 2→FIG. 3→FIG. 4) and for closing or fixing (Figure sequence FIG. 4→FIG. 5→FIG. 6→FIG. 1) of the tank flap 8 is explained, as it can be carried out in particular by the CPU 6. FIG. 7 constitutes the method in the form of a state diagram or automatic machine.

In FIG. 7, "A" describes a state which in particular corresponds to the depiction of FIG. 1, i.e. with completely closed tank flap 8. By manually pressing down the tank flap 8 (Figure sequence FIG. 1→FIG. 2) the pressure switch 5 is actuated which transmits a signal "S" to the CPU 6 for as long as it is closed. A central locking system transmits to the CPU 6 a signal "ZV", which indicates if the same is closed ("ZV=1") or not ("ZV=0").

Figure 2:
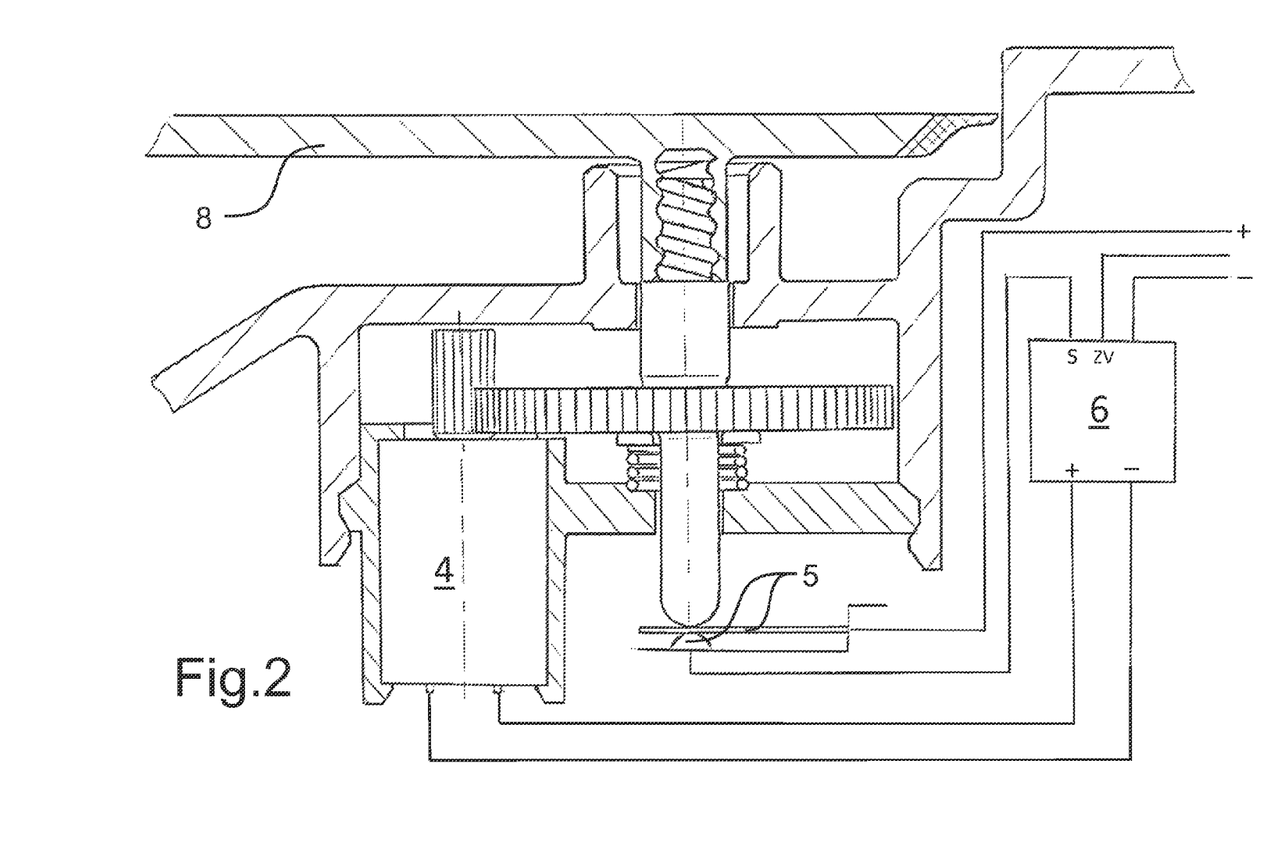
FIG. 2 shows the flap arrangement of FIG. 1 with a manually pressed down flap compared with FIG. 1.
Figure 3:
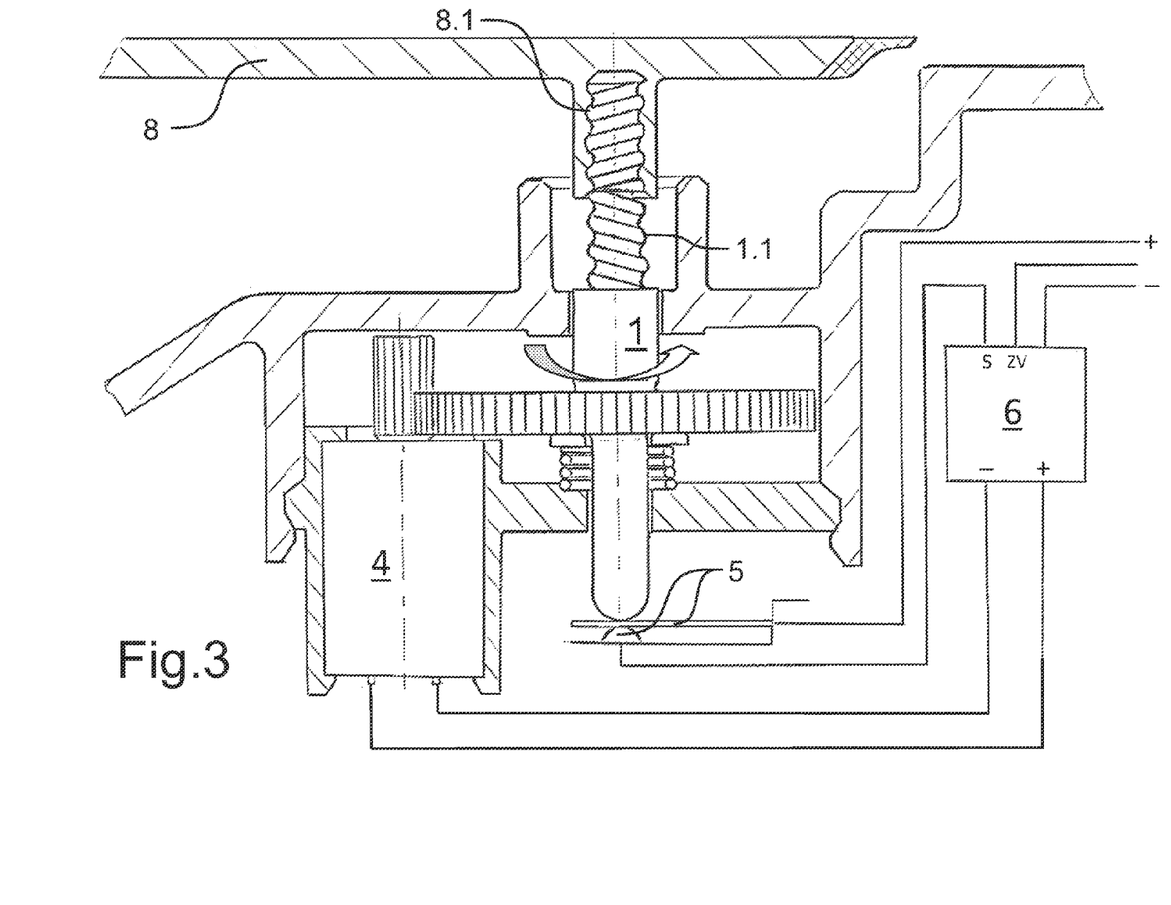
FIG. 3 shows the flap arrangement of FIG. 2 with a manually pushed down flap that is adjustable in opening direction compared with FIG. 2.

When the signals "S" and "ZV=0" are present in a cumulative manner, i.e. the operator actuates the pressure switch 5 via the tank flap 8 and the holder 1, and the central locking system is not closed, the CPU 6 goes into a state B corresponds to the depiction of FIG. 3 (Figure sequence FIG. 2→FIG. 3). In this state, the CPU 6 controls the electric motor 4 so that it actuates the holder 1 for releasing the tank flap 8. To this end, the reverser which is implemented program-wise in the CPU 6 predetermines the direction of rotation indicated by an arrow in FIG. 3, which causes the tank flap 8 to be opened in an opening direction (upwards in FIG. 3).

In this state the CPU 6 remains for as long as the signal "S" is present, i.e. the operator presses onto the tank flap 8. If the signal "S" is eliminated (FIG. 7: "-S"), the CPU 6 goes into a state C which in particular corresponds to the depiction of FIG. 4 (Figure sequence FIG. 3→FIG. 4). In the same, the CPU 6 terminates the energizing of the electric motor 4.

If the operator has pressed onto the tank flap 8 until the electric motor 4 has turned the thread 1.1. out of the mating thread 8.1 or brought the same out of engagement, the tank flap 8 which is now opened out is released and can be completely opened by the operator and/or a torsion spring preloaded in opening direction in order to provide access to the tank aperture. If the operator stops pressing onto the tank flap 8 before the released position is reached, the tank flap 8 which in this exemplary embodiment continues to be fixed remains in a projected position (see FIG. 3).

In a modification, the CPU 6 can remain in the state B until a sensor senses that thread 1.1 and mating thread 8.1 are out of engagement and/or until the holder 1 has opened out the tank flap 8 by a corresponding adjusting travel or the electric motor 4 has reached a corresponding number of revolutions. This can take place independently of the continuing actuation of the pressure switch 5. It can thus in particular be sufficient to actuate the same for a preset, even brief, in particular even impulse-like period of time by pressing down the tank flap 8 and subsequently re-open by releasing the preloaded tank flap 8. In FIG. 7 this can be illustratively imagined in that "S" means the presence of at least one of the following conditions: (1) the pressure switch 5 is (no longer) actuated or closed; (2) thread 1.1 and mating thread 8.1 are out of engagement; (3) the tank flap 8 has been opened out by a predetermined adjusting travel or (4) the electric motor 4 has reached a preset number of revolutions, which corresponds to a complete releasing of the tank flap 8, for example a maximum thread length of the thread 1.1 and mating thread 8.1.

Figure 4:
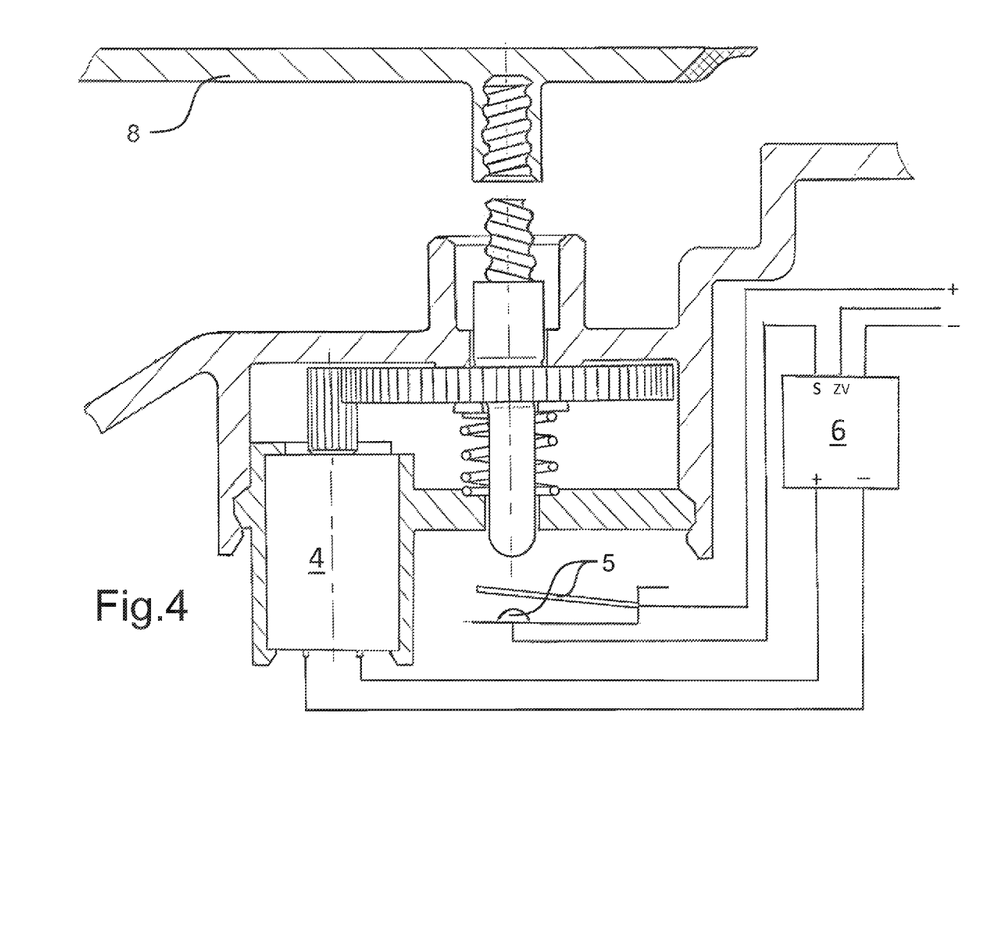
FIG. 4 shows the flap arrangement of FIG. 3 with a released flap compared with FIG. 3.
Figure 5:
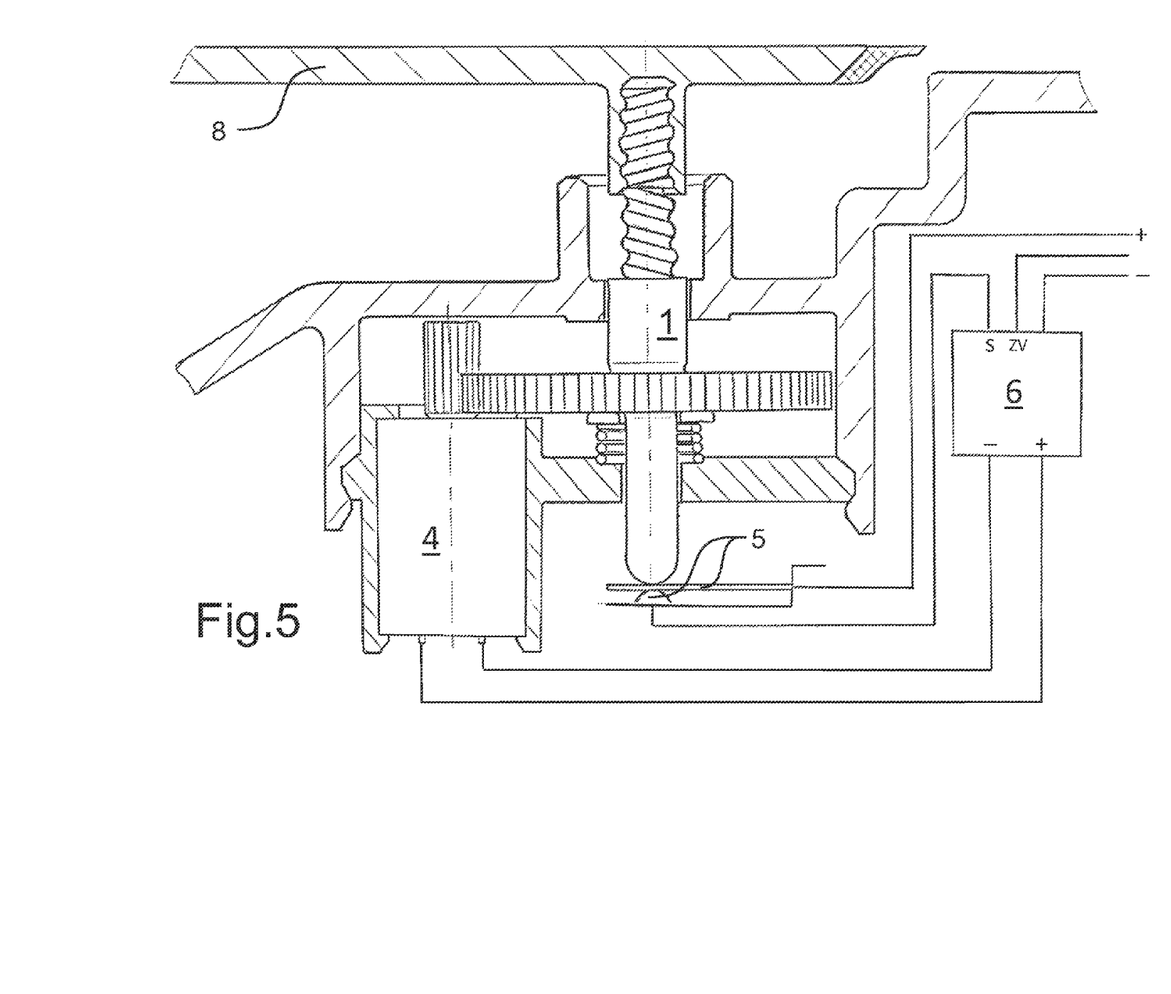
FIG. 5 shows the flap arrangement of FIG. 4 with a manually pushed down flap compared with FIG. 4.
Figure 6:
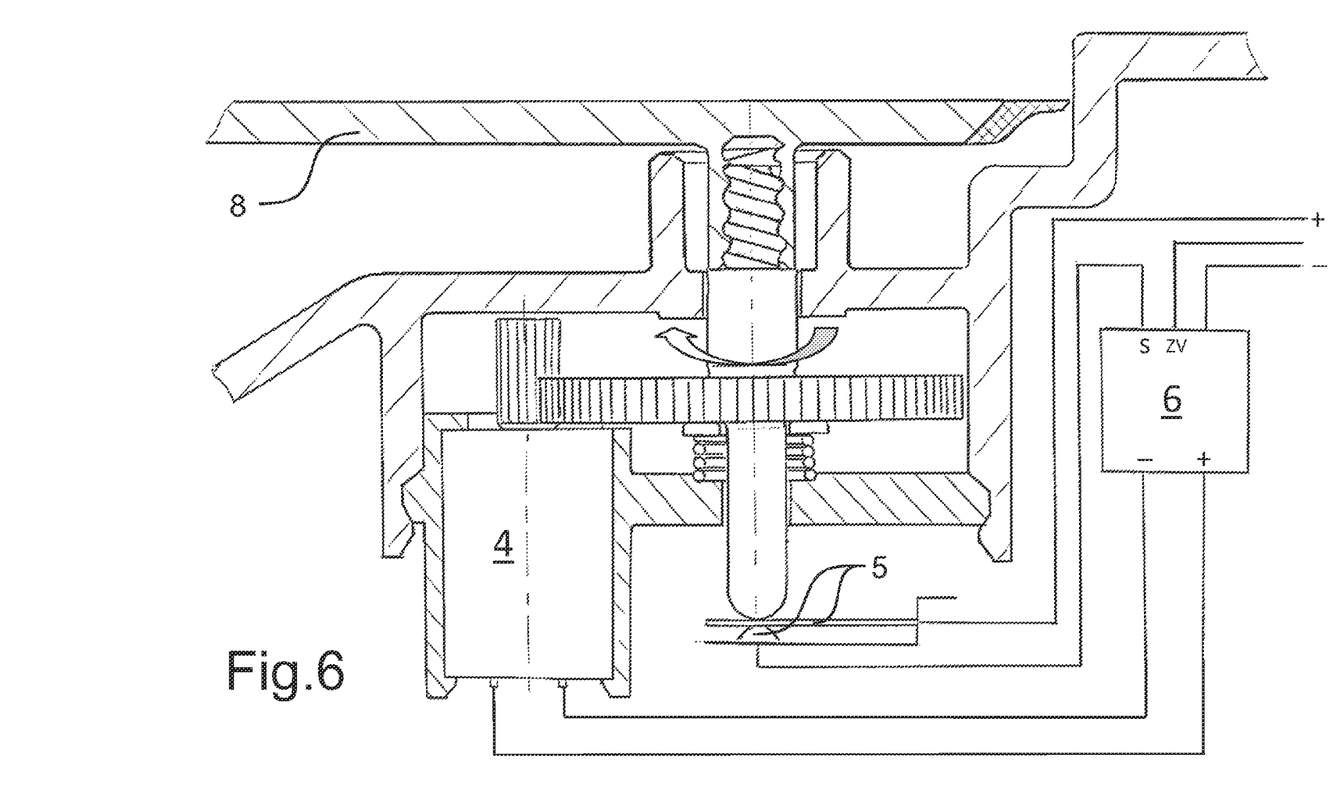
FIG. 6 shows the flap arrangement of FIG. 5 with a manually pushed-down flap that is adjusted in closing direction compared with FIG. 5.
Figure 7:
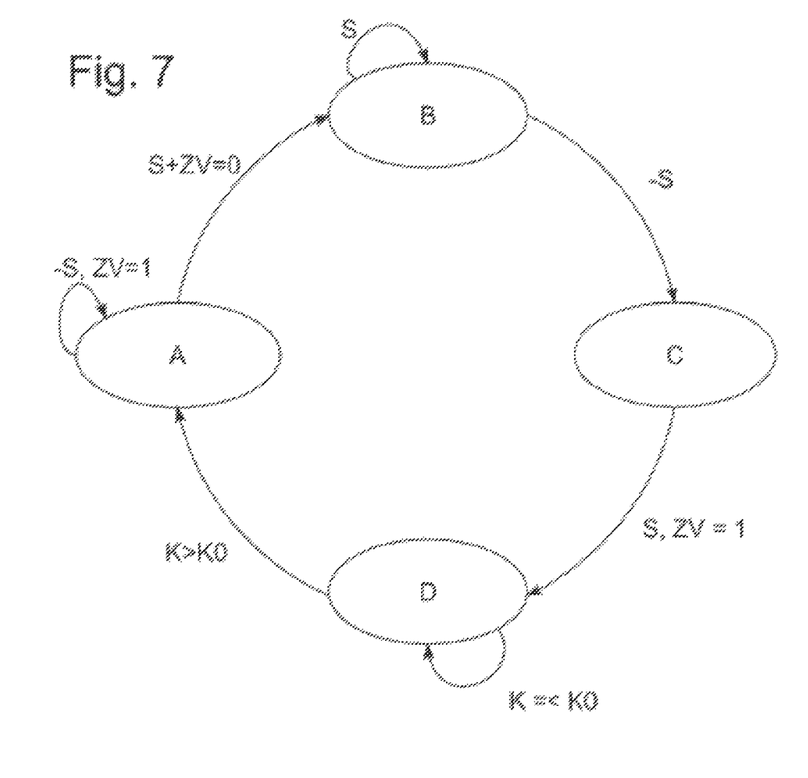
FIG. 7 shows a method for controlling the actuator of the flap arrangement of FIGS. 1-6 and for controlling the actuator of the flap arrangement of FIG. 8, 9.

If in the state C the pressure switch 5 is again actuated (Figure sequence FIG. 4→FIG. 5), the CPU 6 goes into a state D which in particular corresponds to the depiction of FIG. 6 (Figure sequence FIG. 5→FIG. 6). In this state C, the CPU 6 actuates the electric motor 4 so that it actuates the holder 1 in the opposite direction to state B or for fixing the tank flap 8. To this end, the reverser which is implemented program-wise in the CPU 6 predetermines the opposite direction of rotation indicated by an arrow in FIG. 6 which brings about retracting of the tank flap 8.

The CPU 6 remains in this state for as long as a force of the electric motor 4 does not exceed a predetermined limit value (FIG. 7: "K=<K0"). This can, for example, be detected by a power consumption of the travel-controlled, in particular rotational speed controlled electric motor 4. When the electric motor 4 has completely retracted the tank flap 8 the thread 1.1 and mating thread 8.1 for example are at a stop, the force generated by the electric motor 4 increases and exceeds the preset limit value (FIG. 7: "K>K0").

Following this, the CPU 6 goes into the state A (Figure sequence FIG. 6→FIG. 1). In this state A, the CPU 6 terminates energizing the electric motor 4, the retracted tank flap 8 is fixed through thread 1.1 and mating thread 8.1 because of the self-locking of the electric motor 4. Equally, the CPU 6 can go from state C to D through a closing of the central locking, in particular when the tank flap 8 is preloaded in the closing position by a torsion spring. In this way, an opened tank flap 8 contacting the holder 1 under preload and a tank flap 8 which is not completely released (see above omission of the manual loading of the tank flap 8 prior to the complete releasing) can be completely closed and fixed upon closing of a central locking system. Additionally or alternatively to a closing of a central locking, a switching off of an ignition of the vehicle can be analogously taken into account.

In order to avoid continuous empty or no-load rotation with thread 1.1 and mating thread 8.1 out of engagement in state D, the CPU 6 can go into the state A when the electric motor has reached a predetermined number of revolutions. In FIG. 7, this can be illustratively imagined in that "K>K0" means the presence of at least one of the following conditions: (1) the force generated by the electric motor 4 exceeds the preset limit value; (2) the electric motor 4 has reached a preset number of revolutions.

Figure 8:
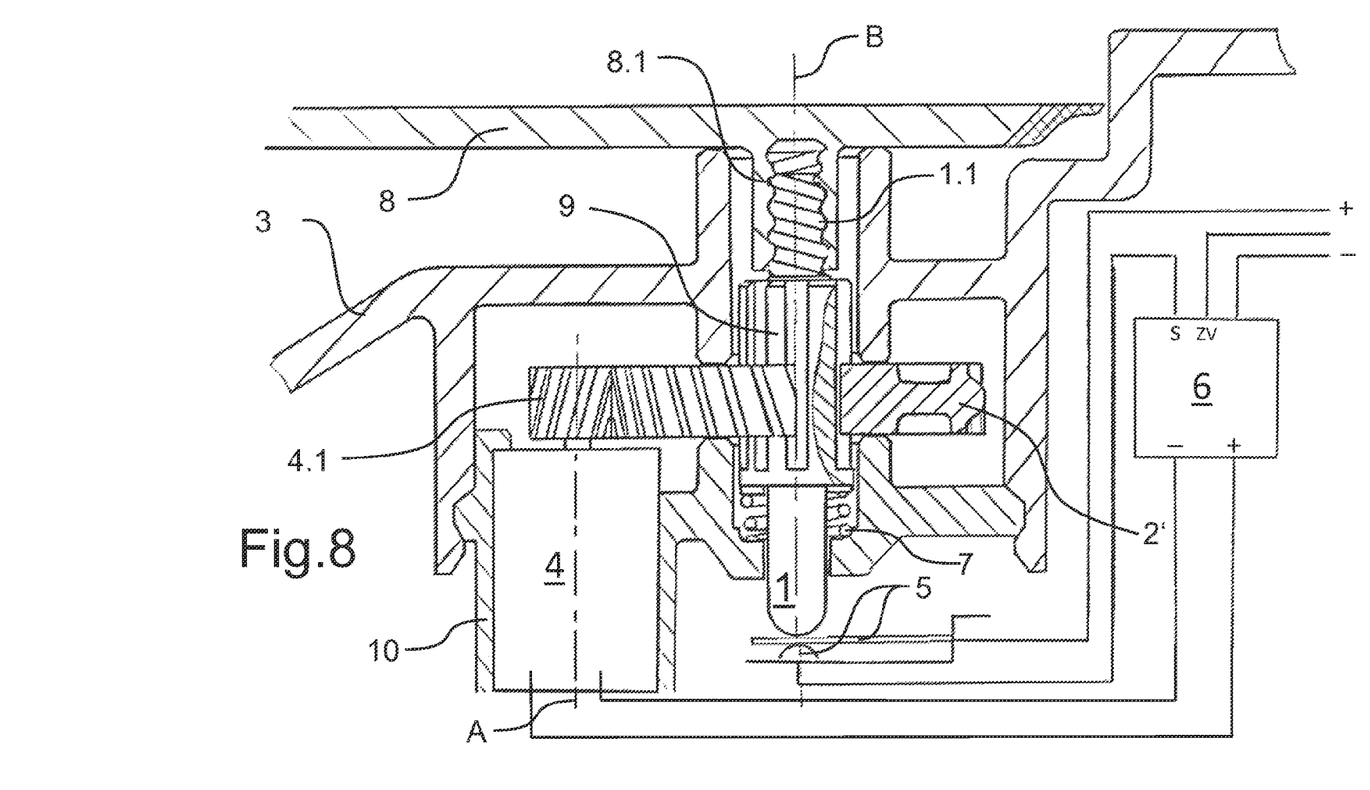
FIG. 8 a flap arrangement according to another embodiment of the present disclosure with a manually pressed down flap.
Figure 9:
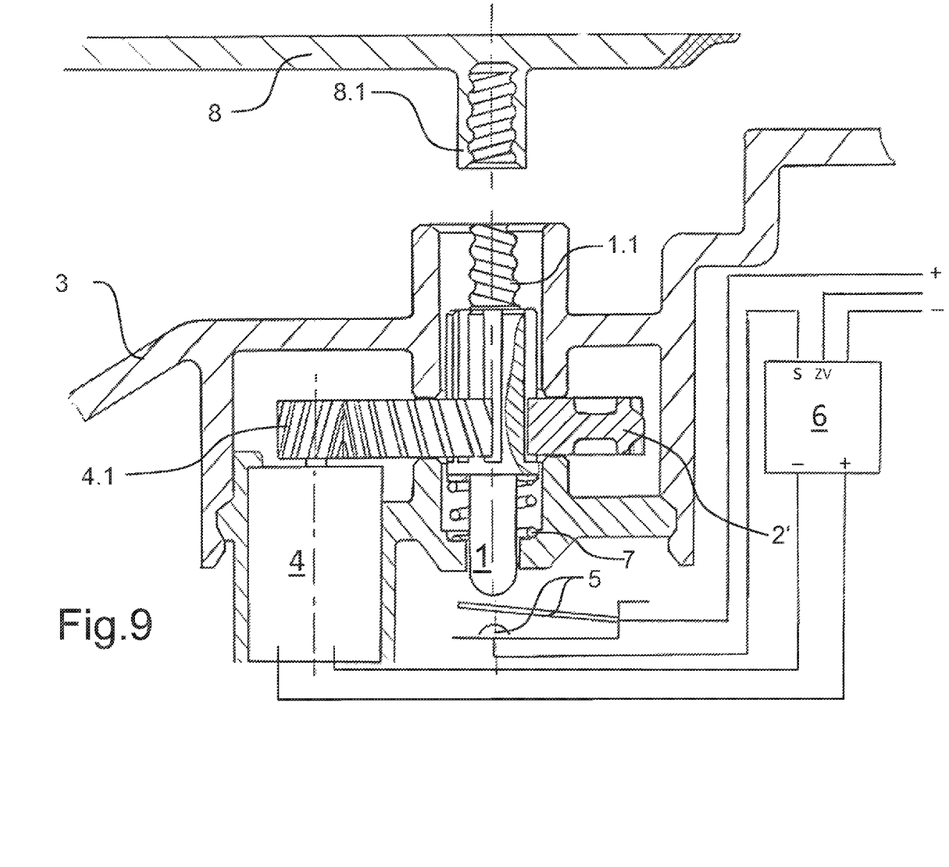
FIG. 9 shown the flap arrangement of FIG. 8 with a released flap.

FIGS. 8 and 9 illustrated a flap arrangement corresponding in representation to FIG. 2, 4 according to an alternate embodiment of the present disclosure. Elements which correspond to one another are identified by identical characters. To explain the flap arrangement according to the embodiment according to FIGS. 8 and 9, in particular its construction, its function, the opening or releasing, the closing or fixing of the tank flap 8 and a method for controlling the electric motor 4 can be carried out in particular by the CPU 6 in a manner as described above according to the embodiment according to FIG. 1 to 7, with differences to this embodiment discussed in the following.

In the embodiment of FIGS. 8 and 9, the gearing, via which the holder 1 and the actuator 4 are coupled, includes a gear 2', which meshes with a further gear in the form of a pinion 4.1 of the actuator 4. This gear 2' is fastened to the holding member 1 in a rotationally fixed but axially shiftable manner by means of a multiple groove or splined profile 9 mounted on the body 3 and the electric motor mounting 10 and thus relative to the actuator 4 in a rotatable and axially fixed manner.

Gear 2' is mounted axially fixed relative to the actuator 4, which is fastened to the holder 1 in a rotationally fixed and axially shiftable manner. As a result, a shifting of gear 2' together with the holder 1 is advantageously avoided in the embodiment of FIGS. 8 and 9. The coupling of the gear 2' to the pinion 4.1 of the actuator 4 can be improved in the embodiment and a weight of the holder 1, which does not move along the gear 2' but is mounted axially fixed relative to the actuator 4, can be reduced. Through the splined profile 9 and axially guidance between gear 2' and holding member 1, a load capacity of a connection between gear 2' and holding member 1 and an axial moveability between gear 2' and holding member 1 can be improved in the embodiment.

In the embodiment of FIGS. 8 and 9, the toothing of the gear 2' is a helical toothing. As a result, the coupling of the gear 2' to the actuator 4 can be improved, in particular a load capacity of the toothing increased and a noise emission of the toothing reduced in the embodiment. In a modification which is not shown, a tooth width of the gear 2' can be smaller than a shifting travel of the holder 1 for fixing and for releasing the flap 8 (vertically in FIG. 8, 9).

Figure 10:
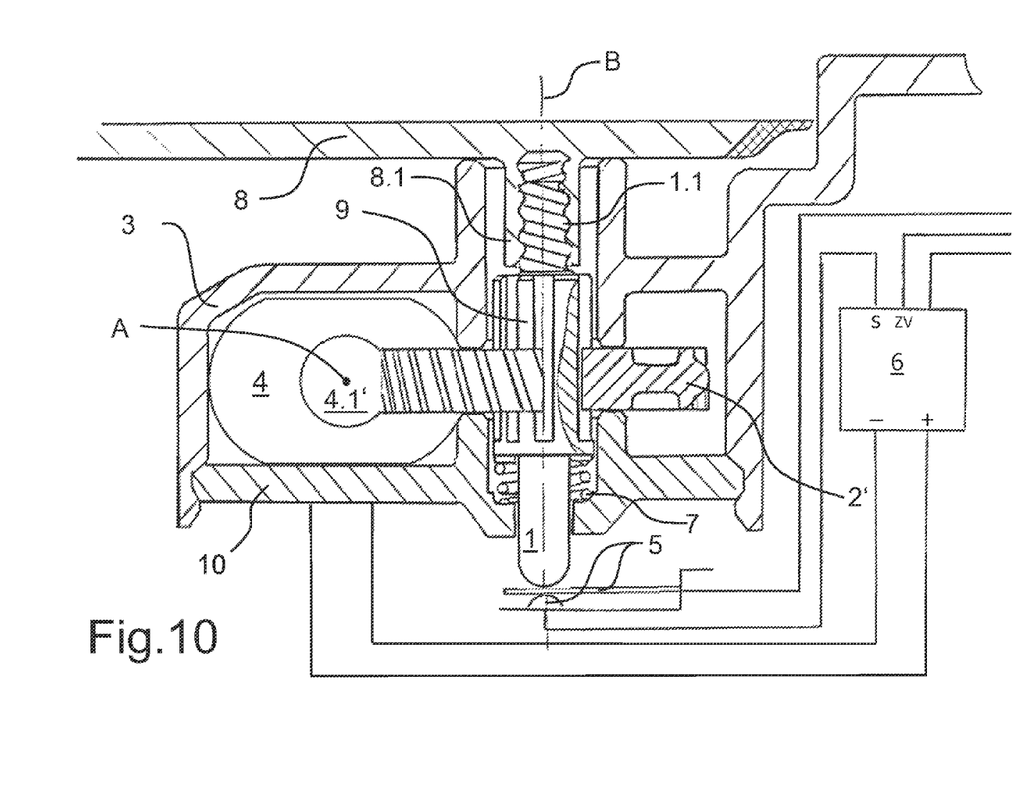
FIG. 10 shows a flap arrangement according to a further embodiment of the present disclosure with a manually pressed down flap.

FIG. 10 shows a flap arrangement in a representation corresponding to FIGS. 2 and 8 respectively according to a further embodiment of the present disclosure. Elements which correspond to one another are again identified by identical characters. To explain the flap arrangement according to the embodiment of FIG. 10, in particular its construction, its function, the opening or releasing, the closing or fixing of the tank flap 8 and a method for controlling the electric motor 4 can be carried out in particular by the CPU 6 in a manner as described above according to the embodiment according to FIG. 1 to 9, with differences to this embodiment discussed in the following.

In the embodiment of FIG. 10, the gearing, via which the holder 1 and the actuator 4 are coupled, includes a gear 2', which meshes with a further gear in the form of a cross-helical or worm gear 4.1' of the actuator 4. This gear 2', as in the embodiment of FIGS. 8 and 9, is fastened to the holding member 1 in a rotationally fixed but axially shiftable manner by means of a multiple groove or splined profile 9 and mounted on the body 3 and the electric motor mounting 10 and thus relative to the actuator 4 in a rotatable and axially fixed manner.

In the embodiment of FIG. 10, an axis of rotation A of an output shaft of the actuator 4 intersects an axis of rotation B of the gear 2' or is inclined against the axis of rotation of the gear by 90° without cutting the same. The gearing is a cross-helical or worm gearing. Because of this, actuator 4 and gear 2' can be advantageously arranged relative to one another, in particular more compactly in the embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A flap arrangement for a motor vehicle comprising:
   a flap positionable with respect to a body member, the flap having a first threaded member formed thereon;
   a spindle supported on the body member for rotation about an axis of rotation, the spindle having a second threaded member formed thereon and configured to engage the first threaded member for fixing the flap with respect to the body member;
   an actuator operably coupled to the spindle for rotating and counter-rotating the spindle; and
   a switch coupled to the actuator for operating the actuator;
   wherein the actuator is operable to rotate the spindle for threading the first and second threaded members to fix the flap in a fixed position and to counter-rotate the spindle for unthreading the first and second threaded members to release the flap from the fixed position;
   wherein the spindle is shiftably mounted on the body for translation along the axis of rotation, and the actuator includes a motor, a drive gear coupled to the motor and a driven gear coupled to the drive gear, the driven gear rotationally fixed on the spindle.

2. The flap arrangement according to claim 1, wherein the fixed position of the flap is adjustable with the spindle in a guided manner.

3. The flap arrangement according to claim 1, wherein the spindle is shiftably positionable within the driven gear along the axis of rotation.

4. The flap arrangement according to claim 1, wherein the driven gear is coupled to the spindle in a rotationally fixed and axially shiftable manner by at least one of a Woodruff key, a fitted key, a sliding key, a splined interface, a serrated profile or a polygon profile.

5. The flap arrangement according claim 1, wherein a toothing of the driven gear comprises a helical toothing.

6. The flap arrangement according to claim 1, wherein an axis of rotation of the drive gear is perpendicular to an axis of rotation of the driven gear.

7. The flap arrangement according to claim 1, wherein a tooth width of the driven gear is smaller than a shifting travel of the spindle for fixing and for releasing the flap.

8. The flap arrangement according to claim 1, wherein the motor comprises an electric motor.

9. The flap arrangement according to claim 1, wherein the switch is operable in response to a manual movement of the flap relative to the spindle.

10. The flap arrangement according to claim 1, further comprising a controller configured to control the actuator based on at least one of an actuation, an actuation duration, an actuation sequence, a state of the flap, a central locking signal, a power supply and a force.

11. A motor vehicle comprising a vehicle body having a body member and a flap arrangement according to claim 1, wherein the flap is mounted the body member.

12. A flap arrangement for a motor vehicle comprising:
a flap positionable with respect to a body member, the flap having a first threaded member formed thereon;
a spindle supported on the body member for rotation about an axis of rotation and translation along the axis of rotation, the spindle having a second threaded member formed thereon and configured to engage the first threaded member for fixing the flap with respect to the body member;
an actuator operably coupled to the spindle for rotating and counter-rotating the spindle, the actuator including a motor, a drive gear coupled to the motor and a driven gear coupled to the drive gear, wherein the spindle is rotationally fixed to and slidably positionable in the driven gear; and
a switch coupled to the actuator for operating the actuator in response to a manual movement of the flap relative to the spindle;
wherein the actuator is operable to rotate the spindle for threading the first and second threaded members to fix the flap in a fixed position and to counter-rotate the spindle for unthreading the first and second threaded members to release the flap from the fixed position.

13. The flap arrangement according to claim 12, wherein the driven gear is coupled to the spindle by at least one of a Woodruff key, a fitted key, a sliding key, a splined interface, a serrated profile or a polygon profile.

14. The flap arrangement according claim 12, wherein a toothing of the driven gear comprises a helical toothing.

15. The flap arrangement according to claim 12, wherein an axis of rotation of the drive gear is perpendicular to an axis of rotation of the driven gear.

16. The flap arrangement according to claim 12, wherein a tooth width of the driven gear is smaller than a shifting travel of the spindle for fixing and for releasing the flap.

* * * * *